US010526756B2

(12) United States Patent
Nosker et al.

(10) Patent No.: US 10,526,756 B2
(45) Date of Patent: Jan. 7, 2020

(54) COMPOSITION DERIVED FROM RECYCLED PAINT

(71) Applicant: Rutgers, The State University of New Jersey, New Brunswick, NJ (US)

(72) Inventors: Thomas Nosker, Stockton, NJ (US); Jennifer K. Lynch, Franklin Park, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 14/936,909

(22) Filed: Nov. 10, 2015

(65) Prior Publication Data

US 2016/0130773 A1  May 12, 2016

Related U.S. Application Data

(60) Provisional application No. 62/078,188, filed on Nov. 11, 2014.

(51) Int. Cl.

| | | |
|---|---|---|
| C09D 101/02 | (2006.01) | |
| C09D 123/08 | (2006.01) | |
| C09D 133/08 | (2006.01) | |
| C09D 109/08 | (2006.01) | |
| C09D 125/14 | (2006.01) | |
| C09D 131/04 | (2006.01) | |
| C09D 5/00 | (2006.01) | |
| C09D 5/33 | (2006.01) | |
| C09D 7/61 | (2018.01) | |
| C08K 3/36 | (2006.01) | |
| C08K 3/04 | (2006.01) | |
| C08K 3/34 | (2006.01) | |
| C08K 7/14 | (2006.01) | |
| C09D 7/43 | (2018.01) | |
| E01C 23/20 | (2006.01) | |

(52) U.S. Cl.
CPC ............ *E01C 23/20* (2013.01); *C09D 5/00* (2013.01); *C09D 5/004* (2013.01); *C09D 7/43* (2018.01); *C09D 7/61* (2018.01); *C09D 101/02* (2013.01); *C09D 109/08* (2013.01); *C09D 123/0853* (2013.01); *C09D 125/14* (2013.01); *C09D 131/04* (2013.01); *C09D 133/08* (2013.01); *C08K 3/04* (2013.01); *C08K 3/34* (2013.01); *C08K 3/36* (2013.01); *C08K 7/14* (2013.01)

(58) Field of Classification Search
CPC ......... E01C 11/005; E01C 23/20; C09D 5/34; C09D 131/04; C09D 109/08; C09D 123/0853; C09D 125/14; C09D 133/08; C09D 7/43; C08K 3/04
See application file for complete search history.

(56) References Cited

U.S. PATENT DOCUMENTS

| | | | |
|---|---|---|---|
| 4,096,061 A | 6/1978 | Brennan | |
| 5,010,129 A * | 4/1991 | Elias | C08K 5/01 524/413 |
| 5,460,703 A * | 10/1995 | Nulman | C23C 14/50 118/503 |
| 5,880,218 A | 3/1999 | Gerace et al. | |
| 5,910,535 A * | 6/1999 | Smith | C09D 133/06 427/387 |
| 6,455,598 B1 | 9/2002 | Gerace et al. | |
| 7,967,988 B1 | 6/2011 | Miller | |
| 8,334,361 B1 | 12/2012 | Gerace | |
| 2012/0148833 A1* | 6/2012 | Cao | B05D 3/067 428/334 |
| 2016/0009561 A1 | 1/2016 | Coleman et al. | |

FOREIGN PATENT DOCUMENTS

| | | | | |
|---|---|---|---|---|
| JP | 06107981 A | * | 4/1994 | |
| JP | 2006249704 A | * | 9/2006 | |
| WO | 2014121348 A1 | | 8/2014 | |
| WO | WO-2014121348 A1 | * | 8/2014 | ............ C09D 5/024 |

OTHER PUBLICATIONS

Machine translated English language equivalent of JP 06-107981 (Apr. 1994, 6 pages).*
CAPlus Abstract of JP 06-107981 (AN 1994:536271, 1994, 1 page).*
Derwent Abstract of JP 2006-249704 (Acc. No. 2008-G94083, 2008, 3 pages).*
Joyce (Homemade Chalky Paint Without Tears. Cedar Hill Farmhouse. Jan. 2012, 53 pages, http://cedarhillfarmhouse.com/2012/01/homemade-chalk-paint-without-tears.html).*
Machine translated English language equivalent of JP 2006-249704 (Sep. 2006, 10 pages).*
Hewitt (Silica as Reinforcing Agent. Compounding Precipitated Silica in Elastomers. William Andrew Publishing, NY. 2007, pp. 1-2).*

* cited by examiner

*Primary Examiner* — Brieann R Johnston
(74) *Attorney, Agent, or Firm* — Fox Rothschild LLP

(57) ABSTRACT

A composition comprising recycled paint and a thermal shock resistant material, a method of making the composition, and a method of applying the composition to a surface to prevent crack or leakage.

15 Claims, No Drawings

//COMPOSITION DERIVED FROM RECYCLED PAINT

CROSS-REFERENCE TO RELATED APPLICATIONS

This application claims priority under 35 USC § 119(e) to U.S. Provisional Patent Application Ser. No. 62/078,188, filed on Nov. 11, 2014, which is hereby incorporated by reference in its entirety.

FIELD

The patent document relates to the field of coating composition containing a recycled paint and a thermal shock resistant material. The composition can be applied to various types of surfaces with an extended usage life.

BACKGROUND

Surface coating plays an important role in structure protection for extended use. Various types of sealant or coating compositions have been developed for structures such as roof and asphalt road surfaces. However, the majority of currently available coating products are comprised of expensive materials often mixed with solvents in high organic content, potentially leading to health and safety hazards.

Accordingly, a need exists to provide a composition that is not only cost-effective with effective adhesion and sealing characteristics but also environmentally friendly by recycling potentially hazardous material into useful products.

SUMMARY

The present invention meets such a need by providing a composition containing recycled paint and a thermal shock resistant material. The composition is environmentally friendly and economic to produce from readily available materials and provides excellent adhesion to various types of surfaces with good weathering characteristics.

In an aspect of the invention there is provided a composition comprising a recycled or waste paint and a thermal shock resistant material. The thermal shock resistant material plays an important role in crack prevention and product life extension. In some embodiments, the paint is recycled or waste latex paint ranging from about 80 to 95% by weight and the thermal shock resistant material ranges from about 3 to 20% by weight.

In some embodiments, the composition of the present invention also contains a coloring agent or viscosity enhancer. Preferably, such an agent or enhancer is carbon black.

In some embodiments, the latex paint ranges from about 85 to 94% by weight and the thermal shock resistant material ranges from about 6 to 14% by weight.

In some embodiments, the latex paint accounts for about 89.5% of the total weight of the composition, the thermal shock resistant material accounts for about 10%, and the carbon black accounts for about 0.5%.

Various types of material are suitable as a thermal shock resistant component of the present composition. Non-limiting examples include silicon-based material, carbon-based fiber, or a combination thereof.

In some embodiments, the thermal shock resistant material contains a silicon-based material, which due to its low thermal expansion coefficient, does not stretch or shrink significantly over a wide range of temperatures, and thus maintains the adhesion of the composition to the surface without cracking or peeling off. Another advantage for silicon-based material is the structural integrity over an extended period of time, in contrast to other material such as fibers from wood and corn which tend to degrade over time.

The silicon-based material can be obtained from naturally occurring or synthetically prepared including silica or silicate. In some embodiments, the silicon-based material comprises fiberglass, mica, or wollastonite.

In some embodiments, the present composition further includes one or more components selected from cellulose fiber, plasticizer, defoaming agent, emulsifier, coloring agent, viscosity enhancer, microbiocide, antioxidant, UV light stabilizer, and UV light absorber.

In another aspect of the invention there is provided a method of treating a surface using the composition of the present invention. Various types of surfaces constructed from different materials can be treated by coating, sealing, caulking or priming with the composition of the present invention. In particular, the present composition can be used to coat or seal roof and asphalt road surfaces.

In another aspect of the invention there is provided a method of making the present composition including the steps of providing a treated or untreated waste or recycled latex paint; and mixing the waste or recycled paint with a thermal shock resistant material having a low thermal expansion coefficient and, optionally, carbon black.

In another aspect of the invention roof surfaces and asphalt road, sidewalk and trail surfaces are provided that are coated, or have cracks filled with the compositions of the present invention. In one embodiment, the road surface is a driveway. In another embodiment, the roof surface includes asphalt shingles.

DETAILED DESCRIPTION

Various embodiments provide a composition including recycled paint and a thermal shock resistant material. The composition can be applied onto a variety of surfaces and exhibit excellent adhesion, tensile strength, and resistance to cracking. Because production of composition involves recycled paint, the cost is low with added benefit of reducing environmental waste.

Throughout this patent document, various publications are referenced. The disclosures of these publications in their entireties are hereby incorporated by reference into this application in order to more fully describe the state of the art to which the disclosed matter pertains. While the following text may reference or exemplify specific paints, fibers, or other materials, it is not intended to limit the scope of the invention to such particular reference or examples. Various modifications may be made by those skilled in the art, in view of practical and economic considerations. In order to more clearly and concisely describe the subject matter of the claims, the following definitions are intended to provide guidance as to the meaning of terms used herein.

Definition

The articles "a" and "an" as used herein refers to "one or more" or "at least one," unless otherwise indicated. That is, reference to any element of the present invention by the indefinite article "a" or "an" does not exclude the possibility that more than one of the element is present.

"About" as used herein refers to the referenced numeric indication plus or minus 10% of that referenced numeric indication.

"Recycled paint" refers to used paint, waste paint, or a leftover portion from unused paint. Sources of recycled paint include, but are not limited to, automotive companies, industrial OEM equipment manufacturers, architectural painting contractors, household paint waste, paint manufacturers, paint distributors which have accumulated paint which is past its shelf life, paint contractors who accumulate paint residues left over from various paint jobs, and local landfills that accept paint waste from consumers.

"Thermal shock" as used herein refers to the disproportionate or differential expansion of various parts of a material under a thermal gradient. When an expansion under a thermal gradient exceeds the strength of the material, a crack may occur. A material is thermal shock resistant if it can handle the stress or strain resulting from the expansion under a thermal shock and substantially maintains its structural integrity. Materials with low thermal coefficients are resistant to thermal shock and do not stretch or shrink substantially over a wide range of temperatures. High thermal conductivity and internal strength are also favorable attributes of a thermal shock resistant material.

Composition

In one aspect there is provided a composition including or recycled paint and a thermal shock resistant material having low thermal expansion coefficient. The recycled paint can be obtained from various sources in different forms, with or without pre-treatment before combining with the sealant thermal shock resistant material. The thermal shock resistant material serves to prevent the sealant composition from developing cracks after being applied to a surface.

The recycled paint can be collected from any source, in a single color or mixed colors, partially dried or dried on the surface with a paint skin. In some embodiments, the paint may optionally be processed to remove excess solvent or contaminant. Water can be optionally added to readjust the viscosity and concentration of the paint. Procedures for such processing are generally known in the art (see, for example, U.S. Pat. Nos. 4,096,061, 5,880,218, 6,455,598, 7,967,988, 8,334,361).

Suitable recycled paint includes oil-based paint and latex paint. The volatile organic content (VOC) of a latex paint is minimal compared to an "oil based" paint, in which the primary vehicle consists mainly of aliphatic and/or aromatic hydrocarbons. Because latex paint mostly uses water as a vehicle, it is less likely to pose health and fire hazards. In some embodiments, the present composition includes a recycled latex paint. Latex paint refers to all paints that use synthetic polymers as binders. Non-limiting polymer examples of latex paint include acrylic, polyvinyl acrylic, styrene acrylic, acrylic copolymer, polyvinyl acetate, styrene butadiene polymer, ethylene vinyl acetate copolymer, and combinations thereof. In some embodiments, the composition comprises a combination of different types or sources of paint. Non-limiting examples include a combination of two waste latex paints with different concentrations or sources, a combination of three or more waste latex paints, and a combination of a waste latex paint and a waste oil-based paint.

The recycled latex paint may be used in the form in which it is collected. However, the paint is preferably screened prior to use to ensure that it is free of large particles or other foreign matter, followed by blending and/or conditioning. For example, a macerator pump may be used to homogenize the pre-screened latex by grinding down larger waste agglomerates into smaller particle sizes. Oil-based paint may be treated by agitating the paint under vacuum under elevated temperatures to remove excess organic solvent, optionally followed by readjusting the viscosity, concentration and content of the residual paint via addition of desirable amount of agents or solvents.

The composition of the present invention also contains a thermal shock resistant material to provide or enhance desirable properties of the present composition. Various types of materials are suitable as the thermal shock material component of the present composition. Non-limiting examples include materials with high thermal conductivity, high internal strength, or low thermal expansion coefficient. In some embodiments, the thermal shock resistant material is a fiber or particles with low thermal expansion coefficient to prevent cracking or maintain adhesion to the surface where the composition is attached to.

Carbon-based fiber is extremely resistant to thermal shock due to its high thermal conductivity as well as low thermal expansion coefficient. Although carbon fiber-reinforced polymer or plastic materials are expensive to produce, recycled carbon fiber can be used for the manufacturing of the present composition. Recycled carbon fiber based material such as carbon fiber-reinforced plastic can be pretreated before being integrated into the sealant composition. Various procedures are known for such pretreatment, including thermal decomposition, milling, or shredding. Adjustments of particular procedures can be conducted without undue experiments as long as the recycled material maintain a desirable range of thermal shock resistance or internal structural strength.

In some embodiments, the thermal shock resistant material is a silicon-based material. Advantages of these silicon-based materials include stability and minimum expansion under conditions of varying temperatures. Unlike organic-based fibers or particles from wood, paper or corn, which tend to degrade or rot over time, silicon-based materials maintain the structure integrity for a much longer period of time. Meanwhile, silicon-based materials having low thermal expansion coefficient also reduce or prevent contraction or expansion over a wide temperature range so that the composition is less likely to crack, deform, or peel off from the attached surface.

Preferable silicon-based materials with low thermal expansion coefficient include various types of silica or silicate. Non-limiting examples of silicates include Nesosilicates, Sorosilicates, Cyclosilicates, Inosilicates, Phyllosilicates, and Tectosilicates.

Silicon-based materials can be obtained from commercial sources or recycled products. Borosilicate glass exhibits superior thermal shock resistance due to its low thermal expansion coefficient and great physical strength. Various types of glass or ceramic materials containing borosilicate glass can be recycled and used into the production of the present composition.

A wide variety of glass-ceramic systems, including $Li_2O \times Al_2O_3 \times nSiO_2$-System (LAS-System), the $MgO \times Al_2O_3 \times nSiO_2$-System (MAS-System), and the $ZnO \times Al_2O_3 \times nSiO_2$-System (ZAS-System), also provide an important recycle source for thermal shock resistant materials.

Non-limiting examples of the sources of the silicon-based material also include mica, wollastonite, and fiberglass. Mica and wollastonite are naturally occurring materials that can be obtained at low cost. Fiberglass in bundles is commercially available and can be readily converted to individual fibers by, for example, burning off the binder. Used products or components such as boat hulls are also sources of fiberglass, which can be extracted after routine steps of burning the hulls and separating out the fibers.

The composition may also include a coloring agent or a viscosity enhancer. Any agent with a desirable color may be incorporated into the present composition. A viscosity enhancer, due to either its physical form or physical-chemical properties, co-operates with the recycled paint to increase the viscosity of the composition. An example of the viscosity enhancer is carbon black, including corresponding subtypes such as acetylene black, channel black, furnace black, lamp black and thermal black. In particular, fine particles of carbon black, due to their fluffy state, can serve as a viscosity enhancer as well as a coloring agent. Carbon black of various forms and particle sizes are available from commercial sources (see, for example, products of Cabot Corp.). Other non-limiting examples of viscosity enhancers include cellulose or derivatives thereof, hyaluronic acid, xanthan gum, alginic acid or derivatives thereof, polyvinylpyrrolidone, acacia, guar gum, acrylates, ethoxylates or derivatives thereof, and carbohydrate.

The ratio of various components of the composition can be adjusted depending on factors including the source and quality of the recycled materials, the purpose and intended timespan for the treatment, the condition of the surface to be treated, the temperature, and other environmental factors.

In some embodiments, the composition contains recycled paint by weight in a range: from about 60 to about 98%, from about 60 to about 95%, from about 65% to about 95%, from about 70% to about 95%, from about 75% to about 95%, from about 80% to about 95%, from about 85% to about 95%, from about 90% to about 95%, from about 80% to about 90%, or from about 85% to about 90%. Alternatively, the composition of the present invention includes at least about 60%, 65%, 70%, 75%, 80%, 85%, 90%, or 95% of the recycled paint.

In some embodiments, the composition contains a thermal shock resistant material such as particles or fibers with low thermal expansion coefficient by weight in a range: from about 4% to about 20%, from about 4% to about 15%, from about 4% to about 10%, from about 6% to about 15%, from about 6% to about 10%, from about 8% to about 15%, from about 8% to about 12%, from about 10% to about 12%, from about 10% to about 15%. Alternatively, the composition contains about 3%, 5%, 8%, 10%, 12%, 14%, 16%, 18%, or 20% of the thermal shock resistant material.

In some embodiments, the composition contains a coloring agent or a viscosity enhancer in a range: from about 0.1% to about 2%; from about 0.3% to about 1.5%; from about 0.3% to about 1.5%; from about 0.6% to about 1.2%; from about 0.9% to about 1.2%. Alternatively, the composition contains about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, or 2% of the coloring agent or viscosity enhancer.

In exemplary embodiments, the composition comprises: about 75 to 98% by weight recycled paint, about 2 to 25% thermal shock resistant material; about 80 to 96% by weight recycled paint, about 4 to 20% thermal shock resistant material; about 83 to 96% by weight recycled paint, about 4 to 16% thermal shock resistant material; about 90 to 95% by weight recycled paint, about 5 to 9% thermal shock resistant material; about 93 to 96% by weight recycled paint, about 4 to 6% thermal shock resistant material; about 80 to 94% by weight recycled paint, about 6 to 20% thermal shock resistant material, and about 1% by weight carbon black; about 80 to 94% by weight recycled paint, about 6 to 20% thermal shock resistant material, and about 0.5% by weight carbon black; about 85 to 94% by weight recycled paint, about 6 to 14% thermal shock resistant material, and about 0.3 to 0.7% by weight carbon black; or about 87 to 92% by weight recycled paint, about 8 to 12% thermal shock resistant material, and about 0.4 to 0.6% by weight carbon black.

The following non-limiting exemplary embodiments further illustrate ratio of different components of the composition:

I. About 85% recycled paint (the remainder being substantially only thermal shock resistant material and coloring agent or viscosity enhancer):
About 14% thermal shock resistant material (Applicants point out for clarity, "about 14% thermal shock resistant material" necessarily requires about 1% viscosity enhancer or coloring agent (e.g. carbon black)), about 14.2% thermal shock resistant material, about 14.4% thermal shock resistant material, about 14.6% thermal shock resistant material, about 14.8% thermal shock resistant material, about 15% thermal shock resistant material.

II. About 85.5% recycled paint (the remainder being substantially only thermal shock resistant material and coloring agent or viscosity enhancer):
About 13.5% thermal shock resistant material (Applicants point out for clarity, "about 13.5% thermal shock resistant material" necessarily requires about 1% viscosity enhancer or coloring agent (e.g. carbon black)), about 13.7% thermal shock resistant material, about 13.9% thermal shock resistant material, about 14.1% thermal shock resistant material, about 14.3% thermal shock resistant material, about 14.5% thermal shock resistant material.

III. About 87% recycled (the remainder being substantially only thermal shock resistant material and coloring agent or viscosity enhancer):
About 12% thermal shock resistant material (Applicants point out for clarity, "about 12% thermal shock resistant material" necessarily requires about 1% viscosity enhancer or coloring agent (e.g. carbon black)), about 12.2% thermal shock resistant material, about 12.4% thermal shock resistant material, about 12.6% thermal shock resistant material, about 12.8% thermal shock resistant material, about 13% thermal shock resistant material.

IV. About 87.5% recycled (the remainder being substantially only thermal shock resistant material and coloring agent or viscosity enhancer):
About 11.5% thermal shock resistant material (Applicants point out for clarity, "about 11.5% thermal shock resistant material" necessarily requires about 1% viscosity enhancer or coloring agent (e.g. carbon black)), about 11.7% thermal shock resistant material, about 11.9% thermal shock resistant material, about 12.1% thermal shock resistant material, about 12.3% thermal shock resistant material, about 12.5% thermal shock resistant material.

V. About 89% recycled (the remainder being substantially only thermal shock resistant material and coloring agent and/or viscosity enhancer):
About 10% thermal shock resistant material (Applicants point out for clarity, "about 10% thermal shock resistant material" necessarily requires about 1% viscosity enhancer or coloring agent (e.g. carbon black)), about 10.2% thermal shock resistant material, about 10.4% thermal shock resistant material, about 10.6% thermal shock resistant material, about 10.8% thermal shock resistant material, about 11% thermal shock resistant material.

VI. About 89.5% recycled (the remainder being substantially only thermal shock resistant material and coloring agent and/or viscosity enhancer):
About 9.5% thermal shock resistant material (Applicants point out for clarity, "about 1% thermal shock resistant material" necessarily requires about 1% viscosity enhancer or coloring agent (e.g. carbon black)), about 9.7% thermal shock resistant material, about 9.9% thermal shock resistant material, about 10.1% thermal shock resistant material, about 10.3% thermal shock resistant material, about 10.5% thermal shock resistant material.

VII. About 90% recycled (the remainder being substantially only thermal shock resistant material and coloring agent and/or viscosity enhancer):

About 9% thermal shock resistant material (Applicants point out for clarity, "about 1% thermal shock resistant material" necessarily requires about 1% viscosity enhancer or coloring agent (e.g. carbon black)), about 9.3% thermal shock resistant material, about 9.5% thermal shock resistant material, about 9.7% thermal shock resistant material, about 10% thermal shock resistant material.

In some of the above embodiments, the recycled paint is recycled latex paint. In some embodiments, the thermal shock resistant material is low thermal expansion coefficient particles or fibers. In some embodiments, the thermal shock resistant material is silicon-based low thermal expansion coefficient particles or fibers. In embodiments, the sealant thermal shock resistant material is fiberglass, mica, wollastonite, or other silicon or silicate-containing materials.

Auxiliary agents may be added to the sealant composition to obtain or enhance other desirable properties. Non-limiting examples of suitable auxiliary agents include cellulose fibers, plasticizers, defoaming agents, emulsifiers, coloring agents, microbiocides, antioxidants, UV light stabilizers, and UV light absorbers. The specific auxiliary agents to be used and their corresponding amounts depend on factors such as surfaces to be treated and environmental elements (temperature, humidity, sunlight exposure, etc.) and can be determined by one of ordinary skill in the art without undue experiments. Crumb rubber can be added to adjust the properties (e.g. strength or flexibility) of the composition as reported in U.S. Pat. No. 6,806,232. In some embodiments, however, the composition of the present invention does not contain crumb rubber.

Method of Treating a Surface

In another aspect there is provided a method of treating a surface comprising applying to the surface the above described composition of the present invention. "Treating" refers to various aspects of protecting or enhancing a service. Non-limiting examples of treating includes coating, sealing, caulking, and priming. The composition of the present invention can be applied to cover the whole area of a surface or only part of the surface.

The exact extent of the treatment of a surface, including the size, depth or thickness, and shape of the treated area depends on the surface condition and the specific composition to be used and can be determined by one of ordinary skill in the art without undue experiments.

The composition of the present invention can be applied to a variety of surfaces including asphalt, asphalt shingles, galvanized steel, aluminum, painted surfaces, wood, masonry and brick and other areas prone to cracking or leakage. In some embodiments, the surface is a roof surface. In some embodiments, the surface is a road surface. In some embodiments, the surface is constructed from asphalt.

The composition of the present invention can be applied by any suitable means, including for example, rolling, brushing, squeegeeing, and troweling. For a surface of large area, the composition may also be sprayed onto the surface. If needed, multiple treatments can be applied to a surface. For example, a road surface may be coated with the present composition multiple times, with suitable intervals between two adjacent treatments. Prior to being applied to a surface, the composition is preferably shaken to achieve an even distribution of the components in the mixture. Diluting or heating are optional steps for pretreating the composition before application.

Method of Composition Preparation

In another aspect there is provided a method of preparing a composition. Various methods can be adopted for preparing the present composition. The specific sequence of addition, temperature, concentration, and other factors relating to the preparation are adjustable depending on the purpose and application of the composition.

In some exemplary embodiments, the method includes the following steps:

providing a treated or untreated recycled paint;
mixing the recycled paint with a thermal shock resistant material;
optionally adding a coloring agent or a viscosity enhancer; and
optionally adding other suitable ingredients to optimize the desirable properties of the composition.

In some embodiments of the method, the paint is a recycled latex paint or a combination of a latex paint and other recycled paint. In some embodiments, the recycled paint is optionally treated, for example, by filtration, by adding water or other suitable solvent, or both, or by removing excess solvent, to adjust the solid content, viscosity, and other relevant properties of the paint. In some embodiments, the thermal shock resistant material is fiberglass or silicon-based particles with low thermal expansion coefficient such as mica or wollastonite. In some embodiments, the optional ingredients include a viscosity enhancer or a coloring agent. A preferred agent serving dual roles as a viscosity enhancer or a coloring agent is carbon black including all its subtypes such as acetylene black, channel black, furnace black, lamp black and thermal black. Controlled heating can also be used if necessary for mixing different components of the composition.

The optionally added auxiliary agents include cellulose fiber, plasticizer, defoaming agent, emulsifier, coloring agent, viscosity enhancer, microbiocide, antioxidant, UV light stabilizer, and UV light absorber.

The method is not limited to any particular sequence for the addition of the paint and other agents. In some exemplary embodiments, the recycled paint, thermal shock resistant material, and viscosity enhancer or coloring agent are added without any particular sequence to an apparatus and stirred so that the components are thoroughly mixed.

Water or other solvent can be optionally added to assist with the mixing, subsequent storage, or adjustment of the solid content. In some embodiments, the solids content of the recycled latex paint is increased by allowing the paint to separate naturally and drawing off the supernatant liquid. In some embodiments, the solid content of the latex paint is increased by removal of water through centrifugation. In some embodiments, the solid content of the latex paint is increased through vacuum evaporation.

The invention claimed is:

1. A sealant composition comprising from about 0.1% to about 2% by weight of carbon black as a viscosity enhancer of the sealant composition, from about 80 to 97% by weight of latex paint, and from about 3 to 20% by weight of a thermal shock resistant material, wherein % by weight is based on the total sealant composition, wherein the thermal shock resistant material is fiber glass, and further wherein the latex paint comprises a binder selected from the group consisting of acrylic polymer, polyvinyl acrylic polymer, styrene acrylic polymer, polyvinyl acetate polymer, styrene butadiene polymer, ethylene vinyl acetate copolymer, and any combination thereof.

2. The composition of claim 1, wherein the latex paint ranges from about 85 to 94% by weight and the thermal shock resistant material ranges from about 5 to 15% by weight.

3. The composition of claim 1, wherein the latex paint accounts for about 89.5% of the total weight of the composition, the thermal shock resistant material accounts for about 10%, and the viscosity enhancer accounts for about 0.5%.

4. The composition of claim 1, further comprising one or more auxiliary agents selected from the group consisting of cellulose fiber, plasticizer, defoaming agent, emulsifier, coloring agent, viscosity enhancer, microbiocide, antioxidant, UV light stabilizer, and UV light absorber.

5. A method of preparing a sealant composition, wherein the sealant composition comprises from about 0.1% to about 2% by weight of carbon black as a viscosity enhancer of the sealant composition, from about 80 to 97% by weight of recycled paint, and from about 3 to 20% by weight of a thermal shock resistant material, wherein % by weight is based on the total sealant composition, wherein the thermal shock resistant material is selected from the group consisting of silica, silicate, fiber glass, mica, wollastonite, a carbon-based fiber, and any combination thereof, and further wherein the recycled paint comprises a binder selected from the group consisting of acrylic polymer, polyvinyl acrylic polymer, styrene acrylic polymer, polyvinyl acetate polymer, styrene butadiene polymer, ethylene vinyl acetate copolymer, and any combination thereof, comprising
providing a treated or untreated recycled paint; and
mixing the recycled paint with a thermal shock resistant material.

6. The method of claim 5, wherein the thermal shock resistant material comprises at least one member selected from the group consisting of mica, wollastonite, and fiberglass.

7. The method of claim 5, further comprising adding a coloring agent or a viscosity enhancer.

8. The method of claim 7, wherein the coloring agent or viscosity enhancer is carbon black.

9. The method of claim 5, further comprising adding one or more auxiliary agents selected from the group consisting of cellulose fiber, plasticizer, defoaming agent, emulsifier, coloring agent, viscosity enhancer, microbiocide, antioxidant, UV light stabilizer, and UV light absorber.

10. The method of claim 5, wherein the recycled paint ranges from about 85 to 94% by weight and the thermal shock resistant material ranges from about 5 to 15% by weight in the composition.

11. The method of claim 5, wherein the recycled paint accounts for about 89.5% of the total weight of the composition, the thermal shock resistant material accounts for about 10%, and the viscosity enhancer accounts for about 0.5%.

12. A sealant composition comprising about 0.5% by weight of carbon black as a viscosity enhancer of the sealant composition, about 89.5% by weight of latex paint, and about 10% by weight of a thermal shock resistant material, wherein % by weight is based on the total sealant composition, wherein the thermal shock resistant material is selected from the group consisting of silica, silicate, fiber glass, mica, wollastonite, a carbon-based fiber, and any combination thereof, and further wherein the latex paint comprises a binder selected from the group consisting of acrylic polymer, polyvinyl acrylic polymer, styrene acrylic polymer, polyvinyl acetate polymer, styrene butadiene polymer, ethylene vinyl acetate copolymer, and any combination thereof.

13. The composition of claim 12, wherein the thermal shock resistant material is silica, silicate, or a combination thereof.

14. The composition of claim 12, wherein the thermal shock resistant material is mica or wollastonite.

15. The composition of claim 12, further comprising one or more auxiliary agents selected from the group consisting of cellulose fiber, plasticizer, defoaming agent, emulsifier, coloring agent, viscosity enhancer, microbiocide, antioxidant, UV light stabilizer, and UV light absorber.

* * * * *